United States Patent
Peleg (10) Patent No.: US 8,954,680 B2
(45) Date of Patent: Feb. 10, 2015

(54) MODIFYING DATA PREFETCHING OPERATION BASED ON A PAST PREFETCHING ATTEMPT

(75) Inventor: Nitzan Peleg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 13/300,587

(22) Filed: Nov. 20, 2011

(65) Prior Publication Data

US 2013/0132680 A1 May 23, 2013

(51) Int. Cl.
*G06F 12/00* (2006.01)
*G06F 12/08* (2006.01)

(52) U.S. Cl.
CPC .................. *G06F 12/0862* (2013.01)
USPC .......................... 711/137; 711/133

(58) Field of Classification Search
USPC .................................. 711/133, 137
See application file for complete search history.

(56) References Cited

U.S. PATENT DOCUMENTS

| | | | |
|---|---|---|---|
| 5,721,865 A * | 2/1998 | Shintani et al. ............... 711/137 |
| 6,912,650 B2 | 6/2005 | Ukai et al. |
| 7,310,100 B2 * | 12/2007 | Hussain ........................ 345/557 |
| 2004/0123043 A1 * | 6/2004 | Rotithor et al. ............... 711/137 |
| 2007/0101066 A1 * | 5/2007 | Al Sukhni et al. ............ 711/137 |
| 2007/0300238 A1 * | 12/2007 | Kontothanassis et al. ..... 719/320 |
| 2009/0006813 A1 * | 1/2009 | Singhal et al. ............... 712/207 |
| 2009/0089509 A1 * | 4/2009 | Shen et al. .................... 711/136 |
| 2010/0023706 A1 | 1/2010 | Chrisrie et al. |
| 2011/0131380 A1 * | 6/2011 | Rallens et al. ............... 711/137 |

OTHER PUBLICATIONS

Dongkeun et al., "Physical experimentation with prefetching helper threads on intel's hyper-threaded processors", in Int'l Symposium on Code Generation and Optimization, Mar. 2004.

Todd C. Mowry, "Tolerating Latency Through Software-Controlled Data Prefetching", Ph.D. Thesis, Computer Systems Laboratory Stanford. Mar. 1994.

* cited by examiner

*Primary Examiner* — Gurtej Bansal
(74) *Attorney, Agent, or Firm* — Ziv Glazberg (57) ABSTRACT

A method, apparatus and product for data prefetching. The method comprising: prefetching data associated with a load instruction of a computer program, wherein the prefetching is performed in anticipation to performing the load instruction, whereby the data is retained in the cache; detecting whether the prefetched data of the prefetching is invalidated after the prefetching commenced and prior to performing the load instruction; and adaptively determining whether to modify the prefetching data operation associated with the load instruction in response to the detection.

16 Claims, 3 Drawing Sheets

MODIFYING DATA PREFETCHING OPERATION BASED ON A PAST PREFETCHING ATTEMPT

TECHNICAL FIELD

The present disclosure relates generally to performance of a Simultaneous Multithreading (SMT) systems or Chip Multiprocessors (CMP) systems and, more particularly to data prefetch for reducing cache miss overhead.

BACKGROUND

The introduction of caches in processors has been an important step in alleviating the problem of ensuring sufficient supply of data into the processor. However, with ever increasing processor speeds and the use of massive instruction level parallelism within processors, performance may be hindered by the data fetching. While the cache is configured to retain data, cache misses (i.e., when requested data is not available and needs to be fetched from a different source) may be associated with considerable cache miss latency. In some cases, when an hierarchical cache is provided, different latency may be associated with different cache misses, depending on the hierarchical distance from the data to be fetched.

This well known problem has attracted much attention from the computer systems research community. Many hardware, software and hybrid schemes to alleviate the problem have been proposed. One example of such scheme is data prefetching. By fetching the data before it is required, the parallelism characteristics are exploited to reduce the cache miss latency overhead.

As prefetching may be associated with some overhead only a small portion of the fetch commands are usually handled by this mechanism. In some cases, delinquent loads of a program are detected and their associated overhead may be reduced using prefetching. "Delinquent loads" are instructions which require loading of data and which are associated with a considerable portion of the overhead of the program associated with cache misses. In some cases, delinquent loads are loads who often cause cache misses. Additionally or alternatively, delinquent loads may be associated with a high average of cache miss latency (e.g., data often needs to be loaded from remote cache levels or from outside of the cache all together). It will be noted the "delinquent load" is a relative term and one instruction may be a delinquent load with respect to a first program and another instruction having similar associated cache miss latencies, may not be considered as a delinquent load in a second program.

However, data prefetching is useful only in case the prefetched data is still relevant once the delinquent load instruction is performed. In some cases, data prefetch might become irrelevant in case the value in the data address used in prefetch is changed by access to the same memory address or same cache line. Data changes may be performed by the same processing entity or a different processing entity.

BRIEF SUMMARY

One exemplary embodiment of the disclosed subject matter is a computer-implemented method performed by a processor having a cache, the method comprising: prefetching data associated with a load instruction of a computer program, wherein the prefetching is performed in anticipation to performing the load instruction, whereby the data is retained in the cache; detecting whether the prefetched data of the prefetching is invalidated after the prefetching commenced and prior to performing the load instruction; and adaptively determining whether to modify the prefetching data operation associated with the load instruction in response to the detection.

Another exemplary embodiment of the disclosed subject matter is a computerized apparatus comprising: a memory, which is arranged to hold a computer program having a load instruction, wherein the memory is operatively coupled to a cache; and a processor, having an associated cache, which is arranged to: prefetch data associated with a load instruction of a computer program, wherein the prefetching is performed in anticipation to performing the load instruction, whereby the data is retained in the cache; detect whether the prefetched data is invalidated after the prefetching commenced and prior to performing the load instruction; and adaptively determine whether to modify the prefetching data operation associated with the load instruction in response to the detection.

Yet another exemplary embodiment of the disclosed subject matter is a computer program product comprising: a non-transitory computer readable medium; a first program instruction for prefetching data associated with a load instruction of a computer program, wherein the prefetching is performed in anticipation to performing the load instruction, whereby the data is retained in the cache; a second program instruction for detecting whether the prefetched data of the prefetching is invalidated after the prefetching commenced and prior to performing the load instruction; a third program instruction for adaptively determining whether to modify the prefetching data operation associated with the load instruction in response to the detection; and wherein the first, second, and third program instructions are stored on the non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to indicate load instructions for which prefetching does not provide a performance improvement.

Another technical problem is to predict if for a certain load instruction, prefetching would be useful or not.

Yet another technical problem is to detect whether prefetched data is invalidated prior to performing the load instruction. In the present disclosure, prefeteched data is said to be invalidated if the prefetched data is different than the data required by the load instruction, such as for example, the data has changed since it was prefetched or the target address of the load instruction is different than the address from which the data was prefetched. In the present disclosure when the prefetched data is invalidated, the prefetch is said to be unsuccessful. In case the prefetched data is not invalidated and can be used when performing the load instruction, the prefetch is said to be successful.

One technical solution is to record successful vs. unsuccessful prefetching operations rate, and thus providing a useful indication as for the usefulness of the prefetching operation.

Another technical solution is to adaptively modify the prefetching operation. In some exemplary embodiments, based on a recorded data, and an indication that the prefetching does not provide a speedup, prefetching may be canceled with respect to the load instruction. Additionally or alternatively, the timing of the prefetching operation may be modified, such as to reduce the chance that the prefetching operation fails. In some exemplary embodiments, the disclosed subject matter may be applied to several load instructions.

Yet another technical solution is to utilize memory transaction mechanism to detect read-write conflicted with respect to prefetched data. A write conflict occurring after the data was read by the prefetch operation is indicative of an unsuccessful prefetch, as the prefetched data is no longer valid, and the valid data needs to be fetched again. A memory transaction may be initiated before prefetching the data and ended after the prefetching has concluded. Optionally, the memory transaction may be ended in response to performing the load instruction itself, after the loading operation is concluded.

In some exemplary embodiments, the memory transaction may be used to monitor the data prefetch. In some exemplary embodiments, hardware transactional memory is utilized, as such a transaction memory having a substantially reduced overhead with respect to software-implemented transaction solution. However, the disclosed subject matter is not limited to a specific implementation of transaction memory.

Furthermore, a diminished capacity implementation of transaction memory may be utilized. The diminished capacity implementation may support read-write conflict detection and may not support rollback capacity.

In some exemplary embodiments, any mechanism which enables conflict detection of a read-write conflict occurring with respect to a memory address accessed during a transaction may be utilized. It will be noted, that while a first access may be performed within a transaction, the second, conflicting, access may be performed not within any transaction.

One technical effect of utilizing the disclosed subject matter is improving performance of a computer program executed by an SMT system or CMP system. In the present disclosure, for sake of clarify, SMT also refers to CMP and any other similar parallel computing systems.

Another technical effect is adaptively modifying decisions of which load instructions are the subject of data prefetching. The experience of actually performing the prefetch is recorded and utilized in better configuring the prefetching operations. It will be noted that generally not all load instructions are the subject of data prefetch operations. In some embodiments, only a minority of load instructions are the subject of data prefetching.

In some exemplary embodiments, the delinquent load is performed within a critical section, and thus failed prefetching may increase time spent within critical sections. Thus, the disclosed subject matter may have the effect of improving performance with respect to delinquent load instructions which are performed within a critical section.

Yet another technical effect is overcoming shortcomings of static analysis methods which cannot always determine if there are stores/writes that change the values in the fetched data addressed after they are prefetched. Data addresses can be, for example, accessed thru more than one pointer and alias analysis cannot conclude if such pointers are aliases or not and therefore cannot detect all read/write conflicts.

Figure 1:
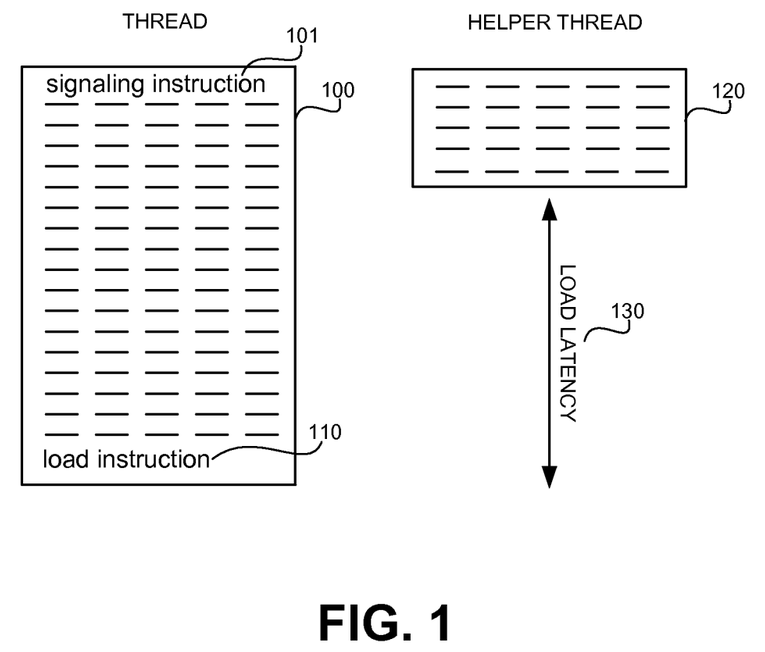
FIG. 1 shows an illustration data prefetching, in accordance with some exemplary embodiments of the disclosed subject matter.

Referring now to FIG. 1 showing an illustration of data prefetching, in accordance with some exemplary embodiments of the disclosed subject matter.

A first processing entity, referred to as a thread, performs some Instructions 100. In anticipation to performing Load Instruction 110, which may be deemed as a delinquent load or selected to be the subject of data prefetching for other reasons (e.g., a determination by a user, profiling information, high performance measurement desired with respect to a portion of the program which comprises Load Instruction 110 or the like), a helper threads may start to perform Prefetching Operations 120, in accordance with the disclosed subject matter.

A thread may be a hardware thread, a core of a CPU, a processor, or the like. A thread may be associated with a cache. In hierarchical caches, the thread may be associated with a specific cache sub-module within the cache hierarchy. However, for simplicity, we refer to the sub-module as the associated cache of the thread.

The helper thread may be a separate thread, having the same associated cache as the thread. Thus, loading data by the helper thread is operative to fetch the data to the cache utilized by the thread and therefore reduce the chance of a cache miss upon performing Load Instruction 110 by the thread.

It will be noted that although FIG. shows a separate helper thread, the disclosed subject matter is applicable to prefetching that is performed by the same thread. Similarly to when a helper thread is utilized, the prefetching operation is operative to cause the associated cache to retain the data, and thus may reduce the chance that the load operation will cause a cache miss.

As can be appreciated, Prefetching Operations 120 may comprise a plurality of instructions, such as aimed at calculating the memory address to be loaded from by Load Instruction 110, and actual loading of the data. In some exemplary embodiments, calculating the memory address requires loading of additional data prior to the address calculation. In some exemplary embodiments, Prefetching Operations 120 are read-only operations and do not modify the data stored in the memory (e.g., store operations are excluded).

Prefetching Operations 120 may commence in anticipation of performing Load Instruction 110. Optionally, data prefetching is timed so as that upon loading the data, Load Instruction 110 is performed. Based on an estimated Load Latency 130 time, and on an estimated time for performing Prefetching Operations 120, the time of commencing Prefetching Operations 120 may be determined. For example, consider an expected load latency of 200 cycles, and expected time for performing data prefetching operations themselves as 10 cycles, then Prefetching Operations 120 may be timed so as to be commenced about 210 cycles prior to expected performance of Load Instruction 110.

In some exemplary embodiments, Signaling Instruction 101 may be executed by the thread and cause helper thread to perform Prefetching Operations 120. Thus, the thread may be able to control timing of performing Prefetching Operations 120. Signaling Instruction 101 may be, for example, a signal command, raising of an interrupt, or other asynchronous communication mechanism. In some cases, Signaling Instruction 101 may be a non-generic instruction useful for initiating prefetch operations and may comprise several instructions. In some exemplary embodiments, insertion of Signaling Instruction 101 may be performed manually, or automatically, such as by offline compiler/optimizer, dynamic compiler/optimizer, instrumentation module, or the like.

Based on sufficient past experience (e.g., above a predetermined threshold number of data prefetching attempts) that concluded that the data prefetching has failed and was unable to avoid a cache miss by Load Instruction 110, an adaptive decision regarding the prefetching may be determined, such as avoiding prefetching from here on. Additionally or alternatively, the adaptive decision may be to delay commencement of Prefetching Operations 120, so as to reduce the chances that the prefetching operation would be invalidated.

Figure 2:
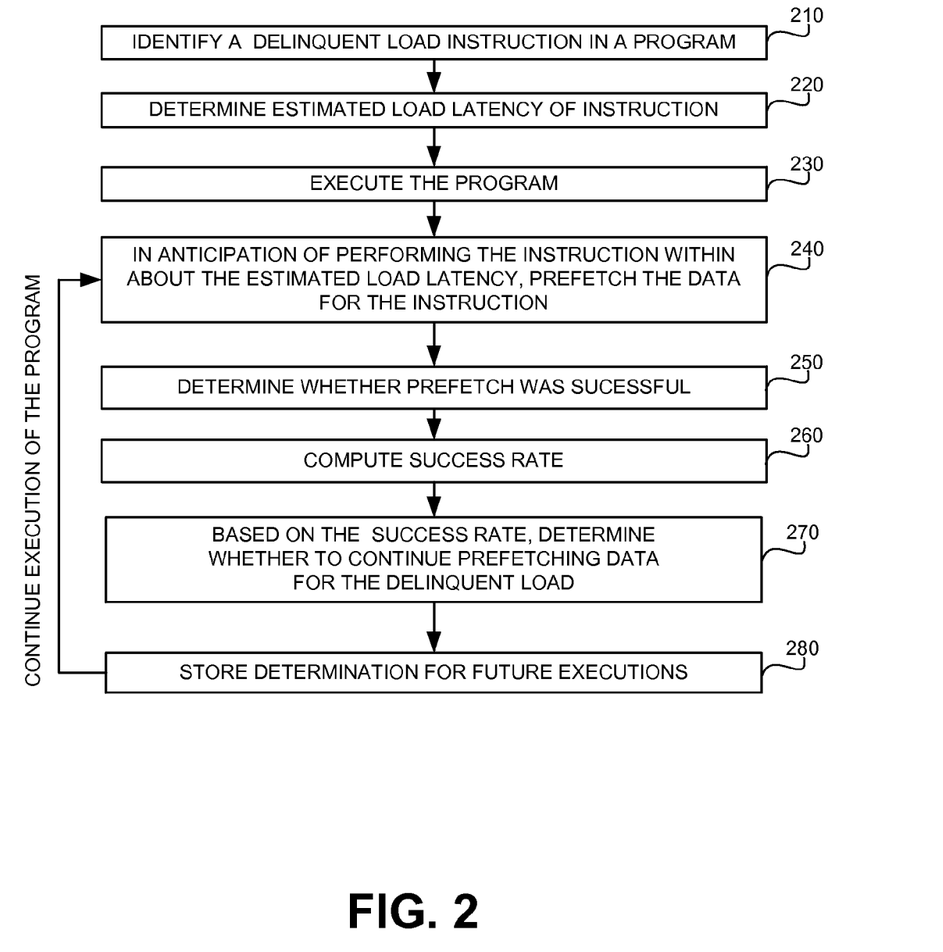
FIG. 2 shows a flowchart diagram of steps in a method for adaptive data prefetching, in accordance with some exemplary embodiments of the disclosed subject matter.

Referring now to FIG. 2 showing a flowchart diagram of steps method for adaptive data prefetching, in accordance with some exemplary embodiments of the disclosed subject matter.

In step 210, one or more load instructions are selected from a computer program to be the subject of data prefetch operations. The load instructions may be selected based on them being considered delinquent load instructions. However, other reasons for selecting the load instructions may be used. In some exemplary embodiments, step 210 may be performed manually, may be based on input by a user identifying the target load instructions or a set of potential load instructions from which a computerized process may select a subset.

The computer program may be any computer program. In some exemplary embodiments, only a binary executable of the program is available, and load instructions are given using a relevant opcode. In some exemplary embodiments, source code of the program may be available. The source code may be designed using a programming language, such as, but not limited to, assembly language, C, C++, C#, Java, or the like.

Selection in step 210 may be based on dynamic analysis of previous executions of the program. For example, a profiling tool may be utilized to dynamically track cache misses and cache miss latencies. Previous executions may be limited to executions by the same SMT system to be used to execute the program or by similar SMT systems having substantially similar configurations (e.g., number of CPUs, cores, hardware threads, cache modules, or the like).

For simplicity and clarity of the disclosure, the rest of FIG. 2 is described while referring to a single load instruction. However, the disclosed subject matter is not limited to a single load instruction and may be applied with respect to plurality of load instructions.

In step 220, an estimated load latency of the instruction may be determined. The estimated load latency may be determined based on previous executions of the program, on collected profiling data, on hardware configuration (e.g., type of cache module, known cache miss latency numbers of the SMT system), or the like. In some exemplary embodiments, in addition to the load latency estimation, an estimation may be made with respect to the time of executing the data prefetch instructions. In some exemplary embodiments, the estimated timings may be utilized in determining a timing to commence in data prefetching prior to the load instruction, as is exemplified by FIG. 1.

In step 230, the program may be executed by a computerized device. The computerized device may be an SMT system.

In step 240, in anticipation of performing the instruction within the estimated time of step 220, prefetching operations may be commenced. Data prefetching may comprise loading beforehand the data which the instruction will try to load, and thus causing the data to be retained within a relevant cache. Data prefetching may further comprise computing the address of the target data, which may require loading of data relevant for the address computation.

In some embodiments, and in order to detect unsuccessful prefetching, prefetching may be performed within a conflict-detection transaction (i.e., the transaction is initiated, prefetching commands are executed and thereafter the transaction is terminated). A conflict-detection transaction is configured to raise an interrupt, throw an exception, or indicate in a different manner, whether a read-write conflict occurred during the transaction. The conflict may occur with respect to a memory location that was accessed by the transaction and is accessed by a different processing entity prior to the completion of the transaction. Thus, if the prefetched data is modified after it was loaded by the prefetching operation, and is therefore not valid and the load instruction will be required to reload the modified data, a conflict may be detected. As another example, in case a data loaded for the purpose of computing the memory address of the target load instruction is modified, a read-write conflict may be detected as well and indicate that the prefetched operation has failed, as the prefetched data may be located in a different address than the address from which data was prefetched.

It will be noted that the disclosed subject matter is not limited to a use of a transaction and other conflict detection mechanisms may be used.

In step 250, it may be determined whether the data prefetched data was invalidated. The data may be invalidated due to a write access that occurred after the prefetching has commenced, and thus the prefetched data may be no longer correct (e.g., either because the data itself was modified or because the address from which the data was prefeteched is different than address from which the data is requested to be loaded by the target load instruction).

In step 260, a success rate may be computed based on the new determination and in view of previous prefetching experience. For example, a data invalidation may be computed as a ratio between invalidated prefetched data and prefetched data that was not invalidated. As another example, a ratio between estimated overhead spared by successful prefetching operations and estimated overhead incurred by unsuccessful prefetching operations may be computed. Overhead spared may be estimated based on the estimated load latency, while estimated overhead added may be estimated based on estimated execution time for performing the data prefetching, while taking into account the concurrency characteristics of the executing device. Other metrics may be utilized in computing the success rate.

In step 270, an adaptive determination may be made based on the success rate, so as to treat future operations of the target load instruction differently. The adaptive determination may be to delay commencement of the data prefetching. Additionally or alternatively, adaptive determination may be to stop performing data prefetching with respect to the target load instruction. In some exemplary embodiments, in case the success rate is below a predetermined threshold, data prefetching for the load instruction may be stopped.

As an example only, a minimal threshold with respect to ratio between successful and unsuccessful prefetching attempts may be 10:1, 4:1, 1:1, 1:5, or the like. As another example, a minimal threshold with respect to spared-incurred overhead may be 1:1, 1.5:1, 2:1, or the like.

In some exemplary embodiments, step 270 may be performed only after gather a minimal amount of data (e.g., 30, 100, 1,000 attempts, or the like).

In step 280, the adaptive determination of step 270 may be stored for future usage. In some exemplary embodiments, in future executions of the program, the adaptive determination may be loaded (e.g., in step 230), and may be implemented.

The execution of the program may continue and steps 240-280 may be executed again, while prefetching in step 240 may be performed in accordance with the adaptive determination of step 270 (e.g., not performed, performed at a different timing, or the like).

Figure 3:
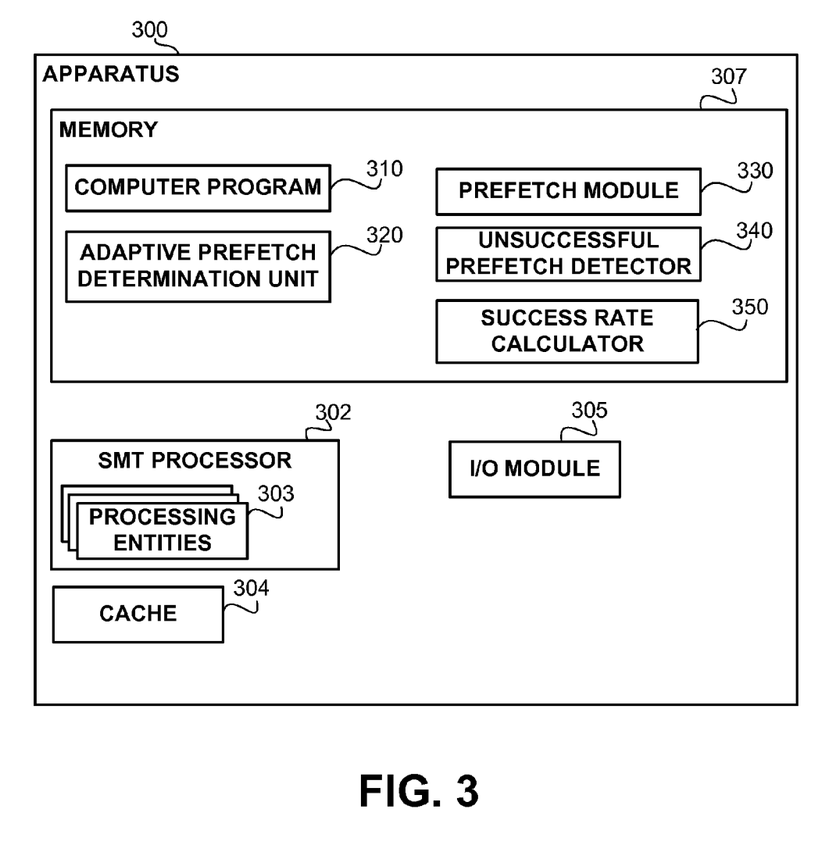
FIG. 3 shows a block diagram of components of a computerized apparatus useful for adaptive data prefetching, in accordance with some exemplary embodiments of the disclosed subject matter.

Referring now to FIG. 3 showing a block diagram of components of a computerized apparatus useful for adaptive data prefetching, An Apparatus 300 may be a computerized apparatus configured to perform a method such as depicted in FIG. 2.

In some exemplary embodiments, Apparatus 300 may comprise an SMT Processor 302. SMT Processor 302 may be a Central Processing Unit (CPU), a microprocessor, an electronic circuit, an Integrated Circuit (IC) or any similar computational device having two or more Processing Entities 303 capable of substantially concurrent computations. SMT Processor 302 may be utilized to perform computations required by Apparatus 300 or any of it subcomponents.

In some exemplary embodiments, Cache 304 may be a cache utilized by SMT Processor 302. Cache 304 may be hierarchical or non-hierarchical. In some exemplary embodiments, each processing entity of SMT Processor 302 may be associated with different sub-module of Cache 304. In some exemplary embodiments, and as is known in the art, in case SMT Processor 302 is instructed to load data from Memory 307, it may first determine whether the data is retained by Cache 304 and retrieve it from the Cache 304. As the Cache 304 is generally faster than Memory 307, this mechanism generally enables reduction in data retrieval latency by the SMT Processor 302.

In some exemplary embodiments of the disclosed subject matter, Apparatus 300 may comprise an Input/Output (I/O) Device 305 such as a receiver, transmitter, transceiver, modem, an input device, an output device or the like. In some exemplary embodiments, I/O Device 305 is utilized to connect to an I/O device for providing input by or output to a human user. It will however be appreciated that the system can operate without human operation.

In some exemplary embodiments, Apparatus 300 may comprise a Memory 307. Memory 307 may be computerized memory, such as persistent or volatile, or a combination thereof. For example, Memory 307 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, Memory 307 comprises several memory devices, such as for example a RAM and a hard disk. In some exemplary embodiments, Memory 307 may retain program code operative to cause SMT Processor 302 to perform acts associated with any of the steps shown in FIG. 2. In some exemplary embodiments, Memory 307 may retain Computer Program 310 having target load instructions, profiling data or similar dynamically collected data relating to execution of the Computer Program 310, adaptive decisions with respect to target load instructions, and other data useful for performing a method in accordance with the disclosed subject matter.

The components detailed below may be implemented as one or more sets of interrelated computer instructions, executed for example by SMT Processor 302 or by another processor. The components may be arranged as one or more executable files, dynamic libraries, static libraries, methods, functions, services, or the like, programmed in any programming language and under any computing environment.

Computer Program 310 may a computer program having load instructions. Computer Program 310 may be software, firmware, or the like.

In some exemplary embodiments, data prefetching may be performed with respect to one or more load instructions of Computer Program 310. Computer Program 310 may be modified, such as by introducing code operative to execute prefetching in anticipation of performing the target load instruction (e.g., with or without the introduction of a helper thread to Computer Program 310).

An Adaptive Prefetch Determination Unit 320 may be operative to determine an adaptive response to past attempts of performing prefetching. The adaptive response may be to stop prefetching data for the target load instruction. Additionally or alternatively, the adaptive response may be a delay in performing the prefetch operation. Other adaptive responses may be utilized. Adaptive Prefetch Determination Unit 320 may be operative to perform steps 270, 280 of FIG. 2.

A Prefetch Module 330 may be configured to perform prefetching. Prefetch Module 330 may introduce code to Computer Program 310 operative to perform data prefetching, such as code for calculating a target memory address (including loading relevant data for the address computation) and loading the data from the target memory address. Prefetch Module 330 may be operative to perform step 240 of FIG. 2.

An Unsuccessful Prefetch Detector 340 may be configured to detect whether a prefetch operation failed or succeeded. In some exemplary embodiments, Unsuccessful Prefetch Detector 340 may be configured to utilize transaction memory of the Apparatus 300 in order to detect read-write conflicts with respect to the target memory address. Unsuccessful Prefetch Detector 340 may be configured to perform step 250 of FIG. 2.

A Success Rate Calculator 350 may compute a success rate of prefetching operations, such as success-failure ratio, spared-incurred overhead ratio, or the like. Success Rate Calculator 350 may be operative to perform step 260 of FIG. 2.

In some exemplary embodiments, a helper thread in accordance with the disclosed subject matter may be operative to perform the following pseudo-code: initialization:

```
    stop_prefetching = false;
    count=0;
    conflicts=0;
prefetch_instructions:
    if (stop_prefetching == true)
        return
    count++
    transaction_begin(failure_detection) // start transaction and set error
    handling
        ... prefetch instructions ...
    transaction_end
failure_detection:
    conflicts++
    if ((conflicts/count) > threshold){
        stop_prefetching = true
    }
```

In some exemplary embodiments, avoiding the activation the prefetch operation (e.g., if (stop_prefetching==true), return) may be performed in other locations to prevent the prefetch, such as for example in the original thread to avoid signaling the prefetch using Signaling Instruction 101.

In some exemplary embodiments, a number of total attempts is counted (i.e., using count variable), and a memory transaction capable of detecting read-write conflicts is initiated. The memory transaction is configured to initiate the error handling code (i.e., failure detection) in response to a read-write conflict. The error handling code increases a count of unsuccessful prefetching operations (i.e., using conflict variable), and makes an adaptive determination—if a percentage of the prefetch operations that have failed (i.e., conflict/count) is above a predetermined threshold, then prfeteching of data associated with the target load instruction is stopped.

In some exemplary embodiments, the failure detection mechanism may provide additional information on the cause of the failure, on the failure location, or the like. Such information may be used in performing the adaptive determination in response to the failure.

In some exemplary embodiments, when several delinquent loads are handled concurrently, a single transaction may be utilized to protect the several delinquent loads. In some exemplary embodiments, in case of single transaction protects several loads, the invalidated prefetch operation may be identified, such as based on information provided by the conflict detection mechanism. Additionally or alternatively, in case a conflict is detected and the relevant delinquent load out of the several protected loads is not known, in future operations some of the prefetches may be turned off alternatively and thereby a statistical indication may be provided as to which prefetch was invalidated.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a processor having a transactional memory and a cache, the method comprising:
   initiating a conflict detection transaction in the transactional memory, wherein the conflict detection transaction is configured to detect a read-write conflict in the transactional memory, wherein the conflict detection transaction is configured to perform prefetching of data associated with a load instruction of a computer program, wherein said prefetching is performed in anticipation to performing the load instruction, whereby the data is retained in the cache, wherein the conflict detection transaction is configured to end immediately upon completion of said prefetching;
   in response to a modification of the data that is loaded during the conflict detection transaction, the transactional memory detecting a read-write conflict; and
   in response to said detecting, adaptively determining whether to modify the prefetching data operation associated with the load instruction thereby treating future operations of the load instruction differently.

2. The computer-implemented method of claim 1, wherein said prefetching is performed by a processing entity and wherein the load instruction is performed by a different processing entity.

3. The computer-implemented method of claim 1, wherein the load instruction is a delinquent load instruction of the computer program.

4. The computer-implemented method of claim 1, wherein the load instruction is an instruction within a critical section within the computer program.

5. The computer-implemented method of claim 1, wherein the determination by said adaptively determining is stored and reused in future executions of the computer program by said processor or processors having similar configurations thereof.

6. The computer-implemented method of claim 1, wherein said adaptively determining comprises reducing expected time difference between said prefetching and performing of the load instruction.

7. The computer-implemented method of claim 1, wherein said prefetching is performed in anticipation to performing the load instruction comprises performing the prefetching at a determined timing prior to an expected timing of performing the load instruction, wherein the determined timing is about an expected cache miss latency associated with fetching the data.

8. The computer-implemented method of claim 1,
   wherein the load instruction is configured to load data from a target address;
   wherein said prefetching comprises: computing a first address based on the target address; and prefetching the data from the first address; and
   wherein the invalidation is a modification that affects the computation of the target address, whereby after the modification the load instruction is configured to load data from a second address.

9. The computer-implemented method of claim 1, wherein said adaptively determining comprises: determining whether to avoid activating the prefetching data operation associated with the load instruction.

10. The computer-implemented method of claim 9, wherein said adaptively determining comprises: calculating a ratio between a number of successful prefetching operations and unsuccessful prefetching operations, and determining to avoid prefetching data associated with the load instruction in response to the ratio being below a threshold.

11. The computer-implemented method of claim 9, wherein said adaptively determining comprises: calculating a ratio between a cumulative estimated performance speedup of successful prefetching operations and cumulative estimated performance reductions of unsuccessful prefetching operations, and determining to avoid prefetching data associated with the load instruction in response to the ratio being below a threshold.

12. A computerized apparatus comprising:
   a transactional memory for retaining data, wherein said transactional memory is operatively coupled to a cache; and
   a processor, having an associated cache, which is arranged to:
      initiate a conflict detection transaction in said transactional memory, wherein the conflict detection transaction is configured to detect a read-write conflict in said transactional memory, wherein the conflict detection transaction is configured to prefetch data associated with a load instruction of a computer program, wherein the prefetching is performed in anticipation to performing the load instruction, whereby the data is retained in the cache, wherein the conflict detection transaction is configured to end immediately upon completion of said prefetching;
      in response to a modification of the data that is loaded during the conflict detection transaction, the transactional memory is configured to detect a read-write conflict; and
      in response to the detection, adaptively determine whether to modify the prefetching data operation associated with the load instruction thereby treating future operations of the load instruction differently.

13. The computerized apparatus of claim 12, wherein said processor is operative to store the adaptive determination and reuse the adaptive determination in future executions of the computer program.

14. The computerized apparatus of claim 12, wherein the adaptive determination is a determination whether to avoid activating the prefetching data operation associated with the load instruction.

15. The computerized apparatus of claim 14, wherein the adaptive determination comprises: calculating a ratio between a number of successful prefetching operations and unsuccessful prefetching operations, and determining to avoid prefetching data associated with the load instruction in response to the ratio being below a threshold.

16. A computer program product comprising:
a non-transitory computer readable medium;
a first program instruction for initiating a conflict detection transaction in a transactional memory, wherein the conflict detection transaction is configured to detect a read-write conflict in the transactional memory, wherein the conflict detection transaction is configured to perform prefetching of data associated with a load instruction of a computer program, wherein said prefetching is performed in anticipation to performing the load instruction, whereby the data is retained in the cache, wherein the conflict detection transaction is configured to end immediately upon completion of said prefetching;
a second program instruction for detecting, by the transactional memory and in response to a modification of the data that is loaded during the conflict detection transaction, a read-write conflict;
a third program instruction for adaptively determining, in response to said detecting, whether to modify the prefetching data operation associated with the load instruction in response to said detection thereby treating future operations of the load instruction differently; and
wherein said first, second, and third program instructions are stored on said non-transitory computer readable medium.

* * * * *